(12) United States Patent
Strehle et al.

(10) Patent No.: US 10,836,367 B2
(45) Date of Patent: Nov. 17, 2020

(54) METHOD FOR HAVING A MOTOR VEHICLE PERFORM A DRIVER-INDEPENDENT BRAKING MANEUVER

(71) Applicant: Robert Bosch GmbH, Stuttgart (DE)

(72) Inventors: Alfred Strehle, Fellbach (DE); Markus Mengelkamp, Bietigheim-Bissingen (DE); Thomas Schmidt, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 66 days.

(21) Appl. No.: 16/310,212

(22) PCT Filed: Apr. 12, 2017

(86) PCT No.: PCT/EP2017/058889
§ 371 (c)(1),
(2) Date: Dec. 14, 2018

(87) PCT Pub. No.: WO2017/220230
PCT Pub. Date: Dec. 28, 2017

(65) Prior Publication Data
US 2019/0210575 A1    Jul. 11, 2019

(30) Foreign Application Priority Data
Jun. 20, 2016  (DE) .......................... 10 2016 210 921

(51) Int. Cl.
*B60T 7/12*    (2006.01)
*B62D 15/02*   (2006.01)
(Continued)

(52) U.S. Cl.
CPC ...... *B60T 8/17557* (2013.01); *B60T 8/17554* (2013.01); *B60W 30/02* (2013.01);
(Continued)

(58) Field of Classification Search
CPC .......... B60T 8/172; B60T 8/1755; B60T 7/12; B62D 15/02; B60W 30/02; B60W 10/20; B60W 10/18
(Continued)

(56) References Cited

U.S. PATENT DOCUMENTS 5,711,025 A  *  1/1998  Eckert ................. B60T 8/17551
                                                         701/83
6,084,508 A  *  7/2000  Mai .......................... B60T 7/22
                                                         340/435
(Continued)

FOREIGN PATENT DOCUMENTS

CN      104870293 A      8/2015
DE      102008034316 A1  1/2010
(Continued)

OTHER PUBLICATIONS

International Search Report dated Jul. 14, 2017 of the corresponding International Application PCT/EP2017/058889 filed Apr. 12, 2017.

*Primary Examiner* — Tan Q Nguyen
(74) *Attorney, Agent, or Firm* — Norton Rose Fulbright US LLP; Gerard Messina

(57) ABSTRACT

A method for carrying out a driver-independent braking maneuver of a motor vehicle includes ascertaining a reference trajectory of the motor vehicle, ascertaining a lateral guidance force variable representing the lateral guidance force necessary for guidance of the motor vehicle on the reference trajectory, ascertaining, as a function of the lateral guidance force variable, a longitudinal force variable representing the maximum longitudinal force transferable in a longitudinal vehicle direction, and, based on the longitudinal force variable and driver-independently, establishing a braking force variable representing the braking force of the motor vehicle.

17 Claims, 2 Drawing Sheets

(51) Int. Cl.
*B60T 8/1755* (2006.01)
*B60W 30/02* (2012.01)

(52) U.S. Cl.
CPC ....... *B62D 15/025* (2013.01); *B62D 15/0265* (2013.01); *B60T 2201/087* (2013.01); *B60T 2201/16* (2013.01); *B60T 2270/402* (2013.01)

(58) Field of Classification Search
USPC .......................................................... 701/70
See application file for complete search history.

(56) References Cited

U.S. PATENT DOCUMENTS

| | | | |
|---|---|---|---|
| 6,359,553 B1* | 3/2002 | Kopischke | B60Q 9/008 |
| | | | 180/169 |
| 2004/0030498 A1* | 2/2004 | Knoop | B62D 6/00 |
| | | | 701/301 |
| 2006/0025893 A1 | 2/2006 | Fischer et al. | |
| 2014/0222309 A1* | 8/2014 | Yamakado | B60W 10/119 |
| | | | 701/89 |
| 2016/0200317 A1* | 7/2016 | Danzl | B60W 10/10 |
| | | | 701/25 |

FOREIGN PATENT DOCUMENTS

| | | |
|---|---|---|
| DE | 102013113685 A1 | 11/2014 |
| DE | 102014013173 A1 | 4/2015 |
| JP | 2004521026 A | 7/2004 |
| WO | 03006288 A1 | 1/2003 |

\* cited by examiner

METHOD FOR HAVING A MOTOR VEHICLE PERFORM A DRIVER-INDEPENDENT BRAKING MANEUVER

CROSS-REFERENCE TO RELATED APPLICATIONS

The present application is the national stage of International Pat. App. No. PCT/EP2017/058889 filed Apr. 12, 2017, and claims priority under 35 U.S.C. § 119 to DE 10 2016 210 921.9, filed in the Federal Republic of Germany on Jun. 20, 2016, the content of each of which are incorporated herein by reference in their entireties.

BACKGROUND

Previously unpublished DE 10 2015 224 601.9 discloses a method for controlling a hydraulic braking system of a vehicle. The braking system encompasses a controllable first brake pressure generator as well as a transducer for a deceleration signal of the vehicle. The method includes: impressing a pressure characteristic onto an original reference braking pressure by way of the first brake pressure generator; and monitoring the deceleration signal for the presence of a deceleration characteristic corresponding to the pressure characteristic.

SUMMARY

An example embodiment of the present invention relates to a method for carrying out a driver-independent braking maneuver of a motor vehicle, where the method includes: ascertaining reference trajectory of the motor vehicle; ascertaining a lateral guidance force variable representing the lateral guidance force necessary for guidance of the motor vehicle on the reference trajectory; as a function of the lateral guidance force variable, ascertaining a longitudinal force variable representing the maximum longitudinal force transferable in a longitudinal vehicle direction; and establishing, driver-independently and as a function of the longitudinal force variable, a braking force variable representing the braking force of the motor vehicle.

Stable lateral guidance, which is necessary especially when braking in a curve, is thereby simultaneously ensured in the context of the braking maneuver of the vehicle.

An advantageous embodiment of the method according to the present invention is characterized in that the driver-independent braking maneuver is carried out in the context of a secondary braking system upon failure of the primary service braking system. The invention makes possible here, in particular, a safe braking maneuver to a halt upon failure of the primary braking system while negotiating a curve or in an avoidance maneuver.

An advantageous embodiment of the method according to the present invention is characterized in that the reference trajectory is ascertained by way of an environment sensor system. Since the environment sensor system of a motor vehicle is often decoupled from the primary service braking system, the data ascertained by the environment sensor system, for example planned trajectories, are often still reliably available even upon failure of the service braking system, and can also be used by a secondary braking system or reserve braking system.

An advantageous embodiment of the method according to the present invention is characterized in that the reference trajectory is characterized by at least one reference value of a transverse dynamics variable characterizing the transverse vehicle dynamics.

An advantageous embodiment of the method according to the present invention is characterized in that the actual value of the transverse dynamics variable is ascertained by way of a sensor system, and a driver-independent steering intervention is carried out in such a way that the actual value is brought closer to the reference value. The vehicle is thereby guided to the extent possible on the ascertained reference trajectory.

An advantageous embodiment of the method according to the present invention is characterized in that the transverse dynamics variable is the yaw rate or the transverse acceleration.

An advantageous embodiment of the method according to the present invention is characterized in that the secondary braking system is a braking system carrying out braking interventions that are symmetrical with reference to the longitudinal vehicle axis.

An advantageous embodiment of the method according to the present invention is characterized in that by way of the evaluation of the output signal of a longitudinal acceleration sensor, a maximally transferable braking force assuming straight-ahead travel is ascertained, and the driver-independent braking force is established as a function of the ascertained required lateral guidance force and the ascertained maximally transferable braking force.

An advantageous embodiment of the method according to the present invention is characterized in that an oscillating braking force variable fluctuation is overlaid on the braking force variable and the maximally transferable longitudinal force is ascertained on the basis of the evaluation of the output signal of a longitudinal acceleration sensor.

An advantageous embodiment of the invention is characterized in that the braking force variable is the braking force in a wheel brake cylinder.

An example embodiment of the present invention is directed to an apparatus containing means that are configured to carry out the method according to the present invention, for example, a control device in which program code for carrying out the method according to the present invention is stored.

DETAILED DESCRIPTION

In the field of automated, highly automated, and partly automated driving of a motor vehicle, vehicle stabilization can be carried out during normal operation via a device for active and passive individual-wheel brake pressure modulation, for example a vehicle dynamics control system together with a pertinent actuator system. This system, provided for normal operation, is referred to as a "primary actuator system."

In the event of a failure of the primary actuator system, a secondary stabilization actuator system or "secondary actuator system," which permits at least longitudinal stabilization of the motor vehicle, is operated. The secondary actuator system is directed toward the following requirements: adherence to a locking sequence must be ensured, i.e., the rear-axle wheels are not permitted to lock until the wheels of the front axis are already locking; time during which wheels are locked must not exceed a predefined duration in order to ensure that the motor vehicle is steerable; and the possibility must exist of an active or driver-independent pressure buildup in order to carry out automated vehicle deceleration.

For safety reasons, it is advisable not to use the sensor data of the primary actuator system for the secondary actuator system, since upon a failure of the primary actuator system, its sensor data can be either absent or defective.

Figure 1:
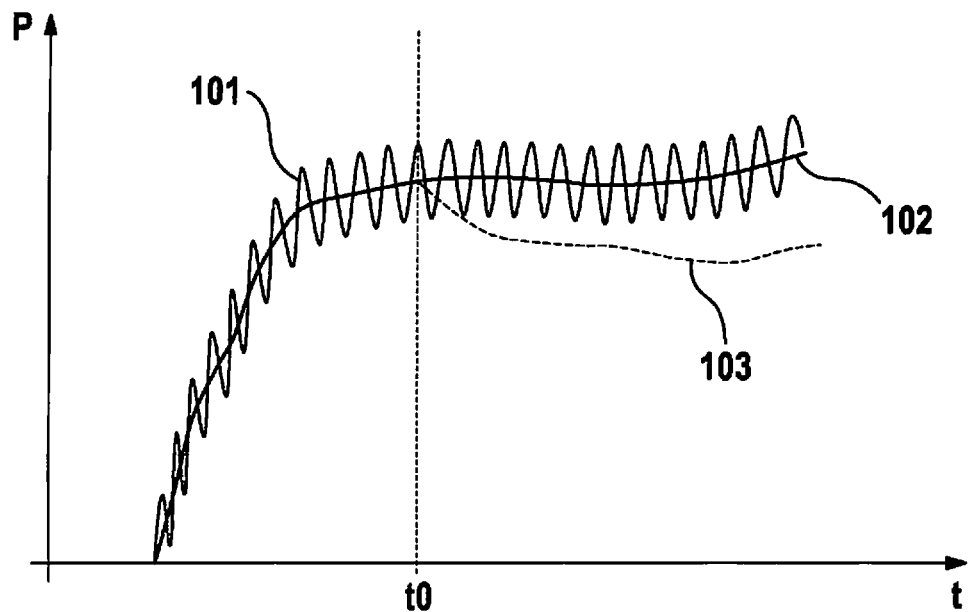
FIG. 1 shows a change over time in a brake pressure P applied by a secondary actuator system according to an example embodiment of the present invention.

Because the secondary actuator system must ensure at least longitudinal stabilization of the vehicle, at least the sensor signals describing the longitudinal dynamics of the vehicle must be available for the secondary actuator system as well. For example, the output signal of a longitudinal acceleration sensor that is not integrated into the primary actuator system can be available for the secondary actuator system. The secondary actuator system can utilize for that purpose, for example, the longitudinal acceleration sensor used in the context of an airbag control system, or a longitudinal acceleration sensor that is shared with the primary actuator system but whose signal processing does not take place in the primary actuator system, so that that sensor is available even in the event of failure of that system. In order to estimate variables relevant to longitudinal dynamics, for example the current coefficient of friction, a sinusoidal brake pressure oscillation can be overlaid, for example, on the brake pressure established in the context of the secondary actuator system at the wheel brake cylinders, as depicted in FIG. 1 and explained in further detail below. The coefficient of friction can then be inferred based on the output signal of the longitudinal acceleration sensor.

Alternatively, upon conveyance to the secondary actuator system, the variables that describe the wheel conditions (e.g. the wheel rotation speeds) can also be used if signal processing thereof does not take place in the control device of the primary actuator system, so that the wheel rotation speeds are reliable even in the event of failure thereof.

Especially in a context of highly automated driving, a reference trajectory for the vehicle, ascertained e.g. by way of a video sensor system, is often known for the vehicle and should be adhered to as closely as possible for safe vehicle guidance. If the reference trajectory has a spatial curvature, as is the case, for example, when negotiating a curve or in an evasive maneuver, the availability of a sufficiently high lateral guidance force is also necessary. This means that the transferable longitudinal vehicle force must not be implemented to its physical maximum, since in that case, in accordance with the friction circle, a lateral guidance force would then no longer be available.

The reference trajectory is notable for variables such as a reference yaw rate pertinent to the respective location, a reference steering angle, or a reference transverse acceleration. If the actual value of at least one of those variables is available in the context of the secondary actuator system, that actual value can then be brought closer to the corresponding reference value by steering interventions or braking interventions. The lateral guidance force pertinent to the reference trajectory at the respective location can be estimated, and the maximum longitudinal force transferable in a longitudinal direction of the tires can be ascertained therefrom based on the friction circle.

In FIG. 1, time t is plotted on the abscissa and a brake pressure P generated by a secondary actuator system is plotted on the ordinate. The number 101 characterizes the oscillating brake pressure profile which has the clearly evident, deliberately applied oscillating brake pressure fluctuations and is applied after failure of the primary actuator. Profile 102 characterizes the brake pressure that is effectively acting. Starting at time t0 indicated with a dotted vertical line, information is available to the vehicle regarding a reference trajectory to be traveled, which was ascertained, e.g., by way of a video and/or radar sensor system. This reference trajectory is traveled autonomously, for example by way of driver-independent steering interventions. At the same time, however, the vehicle is to be safely braked to a halt due to failure of the primary actuator system. Once the reference trajectory is known, i.e., for t>t0, the brake pressure is therefore lowered to profile 103 so that the transverse forces or lateral guidance forces, known as a result of the known reference trajectory, can be applied.

Figure 2:
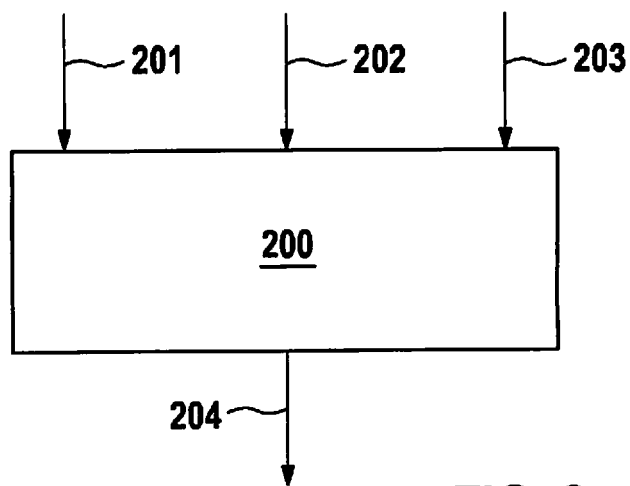
FIG. 2 shows a secondary actuator system with its input variables and output variables according to an example embodiment of the present invention.

In FIG. 2, block 200 identifies the secondary actuator system that is designed for single-channel longitudinal stabilization and comes into use upon a failure of the primary actuator system. FIG. 2 furthermore shows the following input variables into the secondary actuator system: 201, available longitudinal vehicle information, in particular longitudinal vehicle acceleration and deceleration; 202, a reference trajectory for the vehicle, ascertained by way of a sensor system independent of the failed primary actuator system; and 203, sensor variables that are independent of the failed primary actuator system and indicate the actual transverse-dynamics state, for example the yaw rate or transverse acceleration.

The output variable 204 ascertained in FIG. 2 is the target brake pressure or target braking force or target braking moment which is to be established by the secondary actuator system in order to bring the vehicle safely to a halt.

Figure 3:
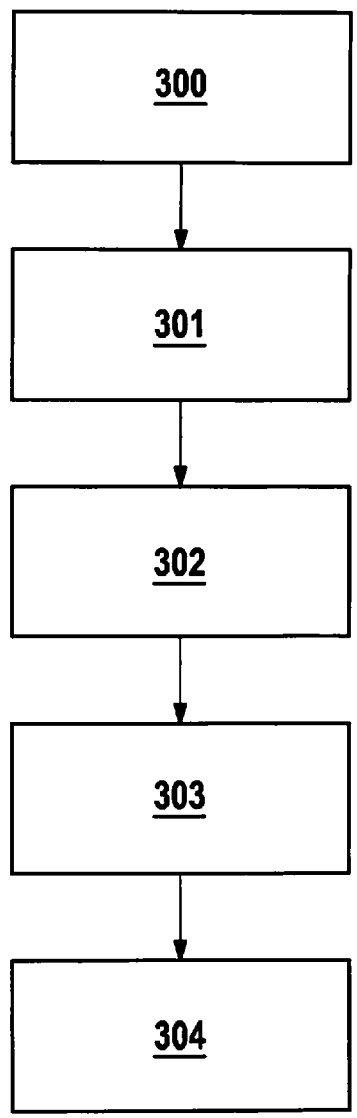
FIG. 3 is a flowchart that illustrates a method according to an example embodiment of the present invention.

FIG. 3 illustrates a method according to an example embodiment of the present invention. At 300, the system ascertains a reference trajectory of a motor vehicle. At 301, the system ascertains a lateral guidance force variable representing a lateral guidance force necessary for guidance of the motor vehicle on the reference trajectory. At 302, the system ascertains, as a function of the lateral guidance force variable, a longitudinal force variable representing a maximum longitudinal force transferable in a longitudinal vehicle direction. At 303, the system establishes, driver-independently and as a function of the longitudinal force variable, a braking force variable representing a braking force of the motor vehicle. At 304, the system carries out a driver-independent braking maneuver of the motor vehicle based on the established braking force variable.

What is claimed is:

1. A method comprising:
   ascertaining a reference trajectory of a motor vehicle;
   based on the ascertainment of the reference trajectory, ascertaining a lateral guidance force variable representing a lateral guidance force necessary for guidance of the motor vehicle on the reference trajectory;
   ascertaining, based on the ascertainment of the lateral guidance force variable and as a function of the lateral guidance force variable, a longitudinal force variable representing a maximum longitudinal force transferable in a longitudinal vehicle direction;
   establishing, driver-independently and as a function of the longitudinal force variable, a braking force variable representing a braking force of the motor vehicle; and carrying out a driver-independent braking maneuver of the motor vehicle based on the established braking force variable.

2. The method of claim 1, wherein the driver-independent braking maneuver is carried out by a secondary braking system upon failure of a primary service braking system.

3. The method of claim 2, wherein the secondary braking system is a braking system carrying out braking interventions that are symmetrical with reference to a longitudinal axis of the vehicle.

4. The method of claim 1, wherein the reference trajectory is ascertained using an environment sensor system.

5. The method of claim 1, wherein the reference trajectory is characterized by at least one reference value of a transverse dynamics variable characterizing transverse vehicle dynamics of the motor vehicle.

6. The method of claim 5, further comprising ascertaining an actual value of the transverse dynamics variable using a sensor system, and carrying out a driver-independent steering intervention to bring the actual value closer to the reference value.

7. The method of claim 5, wherein the transverse dynamics variable is a yaw rate or a transverse acceleration.

8. A method comprising:
ascertaining a reference trajectory of a motor vehicle;
ascertaining a lateral guidance force variable representing a lateral guidance force necessary for guidance of the motor vehicle on the reference trajectory;
ascertaining, as a function of the lateral guidance force variable, a longitudinal force variable representing a maximum longitudinal force transferable in a longitudinal vehicle direction;
ascertaining a maximally transferable braking force, assuming straight-ahead travel, by evaluating an output signal of a longitudinal acceleration sensor;
establishing, driver-independently and based on the longitudinal force variable and the ascertained maximally transferable braking force, a braking force variable representing a braking force of the motor vehicle; and
carrying out a driver-independent braking maneuver of the motor vehicle based on the established braking force variable.

9. The method of claim 8, further comprising overlaying an oscillating braking force variable fluctuation on the braking force variable.

10. The method of claim 9, wherein the braking force variable is a braking force in a wheel brake cylinder.

11. The method of claim 8, wherein the driver-independent braking maneuver is carried out by a secondary braking system upon failure of a primary service braking system.

12. The method of claim 11, wherein the secondary braking system is a braking system carrying out braking interventions that are symmetrical with reference to a longitudinal axis of the vehicle.

13. The method of claim 8, wherein the reference trajectory is ascertained using an environment sensor system.

14. The method of claim 8, wherein the reference trajectory is characterized by at least one reference value of a transverse dynamics variable characterizing transverse vehicle dynamics of the motor vehicle.

15. The method of claim 14, further comprising ascertaining an actual value of the transverse dynamics variable using a sensor system, and carrying out a driver-independent steering intervention to bring the actual value closer to the reference value.

16. The method of claim 14, wherein the transverse dynamics variable is a yaw rate or a transverse acceleration.

17. An apparatus comprising a processor of a motor vehicle, wherein the processor is configured to perform a method, the method comprising:
ascertaining a reference trajectory of the motor vehicle;
based on the ascertainment of the reference trajectory, ascertaining a lateral guidance force variable representing a lateral guidance force necessary for guidance of the motor vehicle on the reference trajectory;
ascertaining, based on the ascertainment of the lateral guidance force variable and as a function of the lateral guidance force variable, a longitudinal force variable representing a maximum longitudinal force transferable in a longitudinal vehicle direction;
establishing, driver-independently and as a function of the longitudinal force variable, a braking force variable representing a braking force of the motor vehicle; and
controlling the motor vehicle to carry out a driver-independent braking maneuver of the motor vehicle based on the established braking force variable.

* * * * *